(12) United States Patent
Ichihara

(10) Patent No.: US 6,915,120 B2
(45) Date of Patent: Jul. 5, 2005

(54) INFORMATION TERMINAL APPARATUS HAVING A VARIABLE DIRECTIONAL ANTENNA AND CONTROL METHOD THEREOF

(75) Inventor: Masaki Ichihara, Tokyo (JP)

(73) Assignee: NEC Corporation, Tokyo (JP)

( * ) Notice: Subject to any disclaimer, the term of this patent is extended or adjusted under 35 U.S.C. 154(b) by 372 days.

(21) Appl. No.: 10/095,024

(22) Filed: Mar. 12, 2002

(65) Prior Publication Data

US 2002/0132581 A1 Sep. 19, 2002

(30) Foreign Application Priority Data

Mar. 15, 2001 (JP) .................................. 2001-074835

(51) Int. Cl.$^7$ ................................................ H04B 1/00
(52) U.S. Cl. .................................... 455/129; 455/63.4
(58) Field of Search .................... 455/25, 63.4, 82, 455/556.1, 556.2, 562.1, 101, 120, 121, 129, 193.1, 193.2, 269, 272, 276.1, 277.1–277.2, 83, 575.7, 97

(56) References Cited

U.S. PATENT DOCUMENTS

| | | | |
|---|---|---|---|
| 6,600,901 B1 * | 7/2003 | Koehne et al. | ............... 455/25 |
| 6,697,642 B1 * | 2/2004 | Thomas | .................... 455/562.1 |
| 2003/0013408 A1 * | 1/2003 | Blodgett et al. | ........... 455/3.01 |

FOREIGN PATENT DOCUMENTS

| | | |
|---|---|---|
| EP | 0 902 498 A1 | 3/1999 |
| GB | 1 488 610 | 10/1977 |
| GB | 1 577 939 | 10/1980 |
| JP | 6-303022 A | 10/1994 |
| JP | 6-334428 A | 12/1994 |
| JP | 7-288417 A | 10/1995 |
| JP | 8-12238 B2 | 2/1996 |
| JP | 10-154911 A | 6/1998 |
| JP | 2874468 | 1/1999 |
| JP | 2000-332667 A | 11/2000 |
| JP | 2001-24431 A | 1/2001 |
| JP | 2001-36337 A | 2/2001 |
| JP | 2001-52674 A | 2/2001 |
| WO | WO 01/05024 A1 | 1/2001 |

OTHER PUBLICATIONS

S. Kojima et al., "Effects of Parastic Elements Configulation on Sector Terminal Antenna", Proceedings of the 2000 IEICE (Institute of Electronics, Information and Communication Engineers) General Conference, pp. B–1–74 and 1 B–1–75.

K. Gyoda et al., "Design of Electronically Steerable Passive Array Radiator (ESPAR) Antennas", 2000 IEEE, AP–S International Symposium, Jul. 2000, pp. 922–925.

* cited by examiner

*Primary Examiner*—Nick Corsaro
(74) *Attorney, Agent, or Firm*—Sughrue Mion, PLLC

(57) ABSTRACT

The information terminal unit comprises a transceiver and a processor, while the variable directional antenna comprises a main antenna element to which the transceiver directly supplies a radio frequency signal, and a plurality of sub antenna elements. The sub antenna elements are connected with variable phase shifter circuits for determining a phase shift amount of a reflecting wave, respectively. The control circuit receives the directivity data from the CPU of the information terminal unit and analyzes the received data to control the phase shift amount of each variable phase shifter circuit. Thereby the phase shift amounts of the respective sub antenna elements are adjusted so that the wave fronts of the waves radiated or secondarily radiated from the main antenna element and sub antenna elements are aligned in a certain direction, and then the variable directional antenna is controlled so as to have a directivity in that direction.

28 Claims, 16 Drawing Sheets

INFORMATION TERMINAL APPARATUS HAVING A VARIABLE DIRECTIONAL ANTENNA AND CONTROL METHOD THEREOF

BACKGROUND OF THE INVENTION

1. Field of the Invention

The present invention relates to a information terminal apparatus having a variable directional antenna, which is mounted to an information terminal unit such as a personal computer, a PDA (Personal Digital Assistant) and a cellular phone, in a system for serving data communications between a base station and an information terminal unit in accordance with a radio communication technology such as, for example, W-CDMA (Wideband Code Division Multiple Access) or wireless LAN, and a controlling method of the variable directional antenna.

2. Description of the Related Art

For a mobile communication terminal unit, the direction of the base station, i.e., the communication partner is not constant and changes depending on the location of the terminal unit, and thus it is believed that an antenna is preferably omnidirectinal as much as possible. For example, a monopole antenna, a helical antenna, an inverted-F internal antenna or the like is used for a cellular phone.

These antennas focus on reducing a size, improving efficiencies (cutting down losses), benefiting from the diversity effect and the like, but they are not intended to achieve high gain directivity. Some of the antennas are provided as external antennas for mounting on a body of a vehicle. They also focus on improving the antenna efficiencies and designed to obtain the maximum omnidirectivity in a plane.

However, it has been recently contemplated to introduce the HSDPA (High Speed Downlink Packet Access) system to W-CDMA. This is provided for performing CDMA (Code Division Multiple Access) data transmissions in a packet mode. As the solutions to the distance problem of CDMA, HSDPA takes approaches such as changing a spread or changing a modulation rather than controlling the power.

That is, a lower spread and/or a faster modulation are assigned to a channel with a low propagation loss (usually, a near user) to provide a high-speed data transmission. On the other hand, a higher spread and slower modulation are assigned to a channel with a high propagation loss (usually, a remote user) to lower the data transmission rate.

The reason for carrying out such operations is that the high speed data transmission with a low spread occupies a lot of CDMA channels, and thus increasing the transmission power results in interference with many other users accordingly. Therefore, the high-speed data transmission is provided only for the limited users who are located near the base station (i.e., users with a low propagation loss), while the remote users (i.e., users with a high propagation loss) are assigned with the low speed data transmission.

As a natural result of introducing such a system, higher data transmissions are allowed to a user with a lower propagation loss, and thus it is advantageous to reduce the propagation loss as much as possible. So the user wishing high speed data transmissions need to take the following two measures: 1) to conduct communications at a place as near the base station as possible where the base station can bee seen directly; and 2) to use directional antenna with high gain.

Among them, the first measure impairs a primary merit of the mobile communications that "communications can be made anywhere". Accordingly, it is most realistic to take the second measure.

As is mentioned above, for the communication system such as HSDPA that will be newly introduced, it is more advantageous to use the directional antenna with high gain, and therefore it is predicted that the needs for the directional antenna increase.

On the other hand, a sector antenna for portable terminal units, the directivity of which can be switched to four directions is proposed in "Proceedings of the 2000 IEICE (Institute of Electronics, Information and Communication Engineers) General Conference, B-1-74 and B-1-75" (hereinafter referred to as Reference 1).

This sector antenna for portable terminal units is formed by a radiator disposed at the center of a circular ground board; and four passive or elements and switching circuits which are symmetrically arranged about the radiator, wherein only one of the passive elements toward the radiation direction is served as a director and the other three elements as reflectors, whereby the antenna directivity are made switchable to four directions.

Further, as a means for switching applications of the passive element between a director and a reflector, there are used an inductor for operating the element as a reflector by equivalently extending the electrical length of the passive element and a switching circuit comprising a PIN diode, FET, or the like for switching between presence and absence of the inductor.

In accordance with the sector antenna for portable terminal units disclosed in Reference 1, an antenna that is able to switch its directivity in the four directions can be implemented. However, such a system in which a passive element is simply switched to either a director or a reflector as mentioned above suffers the problems that it is difficult to allow switching the directivity in four or more multiple directions, and a sufficient gain can not be obtained because the directional characteristics exhibit a relatively wide directivity.

Consequently, a high gain directional antenna, which is switchable to more directions, becomes necessary. As an example of such antennas, it is considered to use an antenna described in "Design of Electronically Steerable Passive Array Radiator (ESPAR) Antennas" 2000 IEEE, AP-S International Symposium, PP. 922–925, July 2000 (hereinafter referred to as Reference 2), or described in Japanese Unexamined Patent Application (KOKAI) No. 2001-24431 (hereinafter referred to as Reference 3).

These antennas described in the above-cited documents References 2 and 3 also comprise a plurality of sub antenna elements symmetrically arranged on a circle about a main antenna element which is the only element being fed. A radio wave is radiated from the main antenna element, and then the respective sub antenna elements reflect the wave after appropriately shifting the phase of each sub antenna element. By adjusting the phase shift amounts of the sub antenna elements so that the wave fronts of the waves are aligned in a certain direction, it is possible to provide (for example, when 7 elements are used) a directivity with a gain of 8 dBi or more in a desired direction.

A variable phase shifter circuit for determining the phase shift amount can be made using a variable reactance element such as a varactor diode. According to the above-cited references, the directivity can be changed continuously, and further a scheme for determining each reactance value for providing a particular directivity is established.

A variable directional antenna with high gain can be achieved by using the antenna elements as mentioned above.

Here, the problem associated therewith is how to control the respective sub antenna elements. It is certainly possible to determine the variable reactance values by using a certain algorithm. However, it is assumed that if a CPU incorporated in the information terminal unit directly calculates and supplies these values to the respective variable phase shifter circuit, the signal transmission between the antennas and the information terminal unit would become complex and the cost, size, and power consumption would be adversely affected.

In addition, it is believed that the variable directional antenna will be primarily used with the antenna being mounted outside the information terminal unit as an optional device. Therefore, it is required that connection between the antenna and the information terminal unit should be as simple as possible. Examples include connection using an only one single coaxial cable. In order to satisfy this requirement, a more simplified directivity control method and a simpler interface become necessary.

SUMMARY OF THE INVENTION

In view of these problems, an object of the present invention is to provide an information terminal unit equipped with a variable directional antenna, comprising a means which has a relatively simple configuration and which is allowed to control the directivity of the variable directional antenna.

Another object of the present invention is to provide a method of controlling the directivity of a variable directional antenna, by which communications are carried out with an optimum antenna directivity being consistently ensured even under circumstances where the information terminal unit is moving and the base station of the information terminal unit is continually changes.

To achieve the above-noted object, the present invention adopts the following basic technical constitution.

Specially, the first aspect of the present invention is an information terminal apparatus comprising: a variable directional antenna; and an information terminal unit for effecting radio communication using the variable directional antenna; wherein the information terminal unit having a transmitting/receiving means, and a processing means for determining a directivity of the variable directional antenna using the transmitting/receiving means; and the variable directional antenna having a control means for controlling the directivity of the variable directional antenna in accordance with directivity data determined by the processing means of the information terminal unit; and the processing means further comprising: a first means for obtaining a directivity characteristics data of the variable directional antenna by sequentially sending a plurality of directivity data to the variable directional antenna; a second means for determining an optimum directivity with the best receiving condition in accordance with obtained directivity characteristics data; and a third means for setting a directivity of the variable directional antenna, based on a result obtained by the second means.

In the second aspect of the present invention, the variable directional antenna comprising: a main antenna element that is fed from the transmitting/receiving means of the information terminal unit and directly radiates a wave; a plurality of sub antenna elements for radiating reflecting wave having a predetermined phase shift amount with respect to the wave radiated from the main antenna element; a variable phase shifter circuit for controlling a reactance component of the sub-antenna element; and directivity control data, stored in a memory, to control the reactance component of the sub-antenna element; and the control means of the variable directional antenna having: a data receiving means for receiving directivity data from the information terminal unit; a data readout means for reading out the directivity control data from the memory, based on the received directivity data; and a D/A converter for converting the directivity control data into an analog voltage; thereby the control means controls the reactance component of the variable phase shifter circuit in accordance with the analog voltage output from the D/A converter.

In the third aspect of the present invention, the variable phase shifter circuit having a varactor diode connected to the sub-antenna element.

In the fourth aspect of the present invention is, the variable directional antenna comprising: a main antenna element that is fed from the transmitting/receiving means of the information terminal unit and directly radiates a wave; a plurality of sub antenna elements for radiating reflecting wave having a predetermined phase shift amount with respect to the wave radiated from the main antenna element; a strip line for controlling a reactance component of the sub-antenna element; a plurality of stubs provided in order to change the reactance component of the sub-antenna element; and a plurality of switching means for controlling a connection between the strip line and the stubs, respectively, and the control means of the variable directional antenna having: a data receiving means for receiving directivity data from the information terminal unit; and a decoder for controlling the switching means, based on the received directivity data; thereby the control means controls the reactance component of the sub antenna in accordance with an output signal of the decoder.

In the fifth aspect of the present invention, the variable directional antenna comprising: a main antenna element that is fed from the transmitting/receiving means of the information terminal unit and directly radiates a wave; a plurality of sub antenna elements for radiating reflecting wave having a predetermined phase shift amount with respect to the wave radiated from the main antenna element; a strip line for controlling a reactance component of the sub-antenna element; and a plurality of switching means for connecting between different positions of the strip line and the ground, so as to change the reactance component of the sub-antenna element; and the control means of the variable directional antenna having: a data receiving means for receiving directivity data from the information terminal unit; and a decoder for controlling the switching means, based on the received directivity data; thereby the control means controls the reactance component of the sub antenna in accordance with an output signal of the decoder.

In the sixth aspect of the present invention, the information terminal apparatus according to claim 1, wherein the variable directional antenna comprising: a main antenna element that is fed from the transmitting/receiving means of the information terminal unit and directly radiates a wave; a plurality of sub antenna elements for radiating reflecting wave having a predetermined phase shift amount with respect to the wave radiated from the main antenna element; a strip line for controlling a reactance component of the sub-antenna element; a plurality of stubs provided in order to change the reactance component of the sub-antenna element; and a plurality of switching means for controlling a connection between the stub and the strip line or the stub and the ground so as to be a short stub or an open stub; and the control means of the variable directional antenna having: a data receiving means for receiving directivity data from the information terminal unit; and a decoder for controlling the switching means, based on the received directivity data; thereby the control means controls the reactance component of the sub antenna in accordance with an output signal of the decoder.

In the seventh aspect of the present invention, the switching means is either a GaAs FET or a PIN diode.

In the variable directional antenna of the present invention, a predetermined number of directivity patterns can be provided, and a particular period for selecting a directivity is provided, and during the period, the processing circuit instructs the control unit to perform a directional scanning sequentially for all the directivities that the variable directional antenna can take, then instructs the transmitting/receiving circuit to determine the quality of the received signal for each of the directivities, and selects an optimum directivity having the best receiving condition based on the results, whereas during the period other than the particular period, the processing circuit performs communications with the optimum directivity. The "quality of the received signal" in this context means a received electric field strength, SIR (Signal to Interference Ratio) taking the influence of an interfering wave into account, and the like. In the CDMA scheme, signals from other base stations are also mixed into the same frequency channel, and therefore, under the effect thereof, the quality of the received data often deteriorates. Thus it is preferable to use SIR for CDMA.

In the present invention, it is particularly presumed that the information terminal unit employs a wireless packet communication scheme. In such a case, it is characterized that the particular period is included in a period when the information terminal unit does not transmit and receive a packet, and the directivity of the variable directional antenna is fixed to the optimum directivity while a packet is being transmitted or received, and that the aforementioned particular period also includes a predetermined duration sufficient and necessary for setting all the directivities that the variable directional antenna can take, measuring the qualities of the received data thereof, determining the optimum directivity, and fixing the antenna directivity thereto, and wherein the particular period is provided immediately before the information communication terminal unit transmits or receives a packet.

DESCRIPTION OF THE PREFERRED EMBODIMENTS

Figure 1:
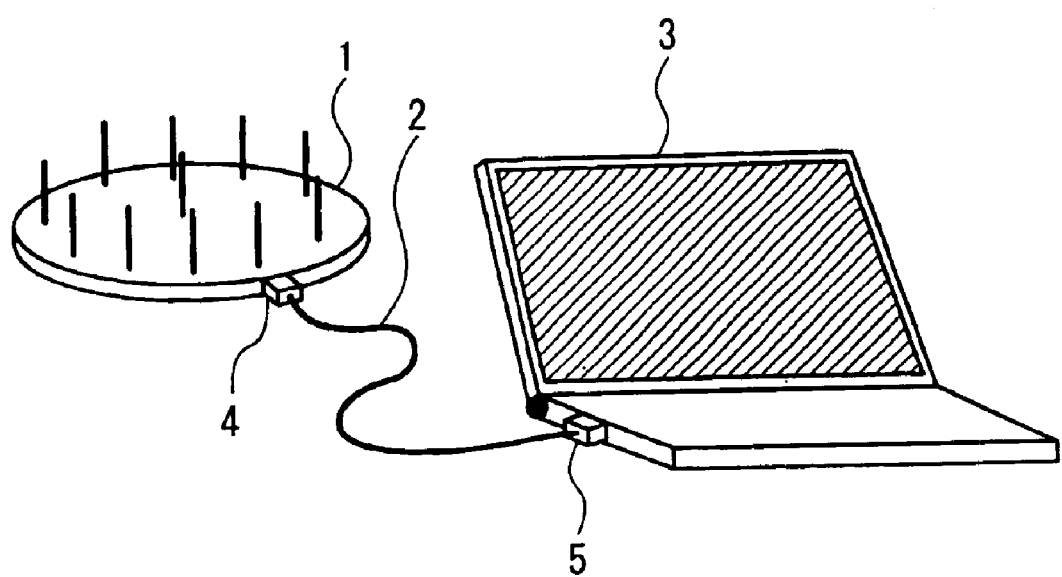
FIG. 1 is a drawing showing a variable directional antenna and an information terminal unit of the present invention.

FIG. 1 is a conceptual connection diagram showing the basic configuration of the present invention. In this figure, a variable directional antenna (1) is connected to an information terminal unit (3) via a connector (4), a cable (2) and a connector (5). The information terminal units (3) may include, for example, a personal computer, a PDA, and a cellular phone.

Figure 2:
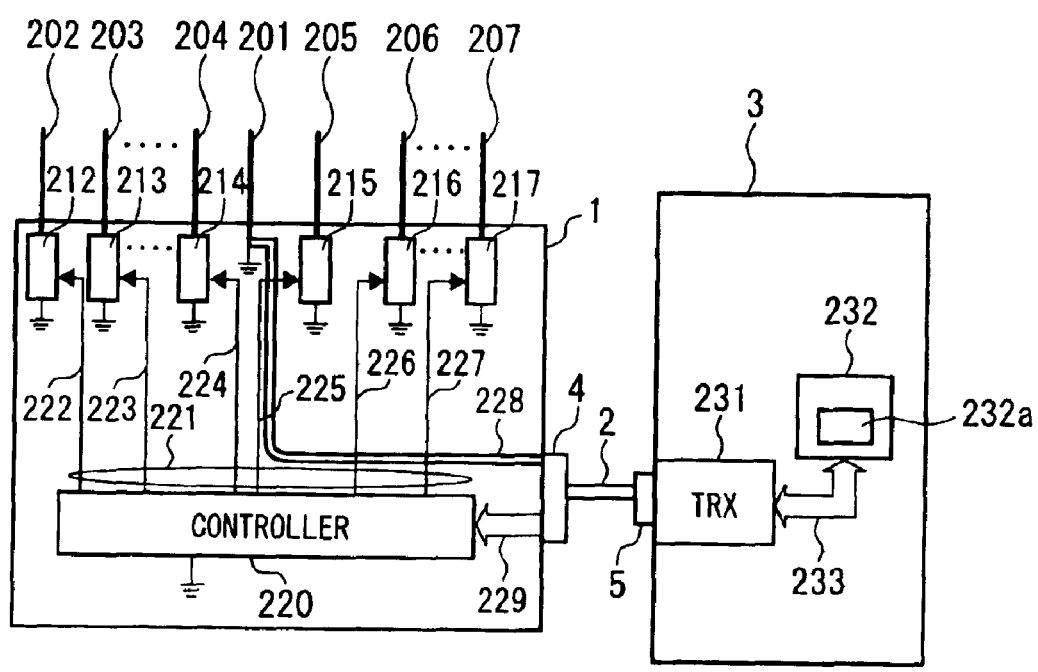
FIG. 2 is a block diagram showing a variable directional antenna and an information terminal unit of the present invention.

FIG. 2 is a functional block diagram of the present invention. The information terminal unit (3) comprises a transceiver (231) for transmitting and receiving a radio frequency signal and a processor (232) such as a CPU. The variable directional antenna (1) comprises a main antenna element (201) to which a radio frequency (RF) signal is supplied from the transceiver (231), and a plurality of sub antenna elements (202 to 207) for radiating a reflecting wave having a phase shifted (that is, phase-shifted) with respect to the wave radiated from the main antenna element (201).

The respective sub antenna elements (202 to 207) are connected with a phase shifter circuits (212 to 217) for determining the phase shift amounts of the reflecting waves respectively, and the phase shift amounts of the variable phase shifter circuits (212 to 217) are controlled by a control circuit (220). This control is carried out using corresponding control signals (222 to 227). Each of the control signals (222 to 227) may be an analog voltage or a logic signal of a plurality of bits.

The control circuit (220) receives a directivity data (229) from the CPU (232) of the information terminal unit (3) via the transceiver (231), connector (5), cable (2), and connector (4). Then the control circuit (220) analyzes the received data and generates corresponding control signals (222 to 227) for controlling the phase shift amounts of the variable phase shifter circuits (212 to 217).

Thereby the phase shift amounts of the respective sub antenna elements are adjusted so that the wave fronts of the waves radiated or secondarily radiated from the main antenna element (201) and sub antenna elements (202 to 207) are aligned in a certain direction, and then the variable directional antenna (1) is controlled so as to have a directivity in the direction.

In the present invention, a disk shaped is presumed on which the sub antenna elements (202 to 207) are uniformly spaced around the main antenna (201) along the circumference of a circle having a radius of λ/4, where λ is a length of a relevant radio wave. Particularly, when the number of the sub antenna elements are six, the distances between the adjacent sub antenna elements and the distances between the respective sub antenna elements and the main antenna element are all equal to λ/4, and all antenna elements are disposed in a regular hexagonal shape. Main body of the variable directional antenna (1) is a ground plane made of metal except the main antenna element (201) and the sub antenna elements (202 to 207).

The shape of the aforementioned antenna corresponds to that of the ESPAR (Electronically Steerable Passive Array Radiator) antenna described in the aforementioned Reference 2"Design of Electronically Steerable Passive Array Radiator (ESPAR) Antennas" 2000 IEEE, AP-S International Symposium, PP. 922–925, July 2000.

Figure 3:
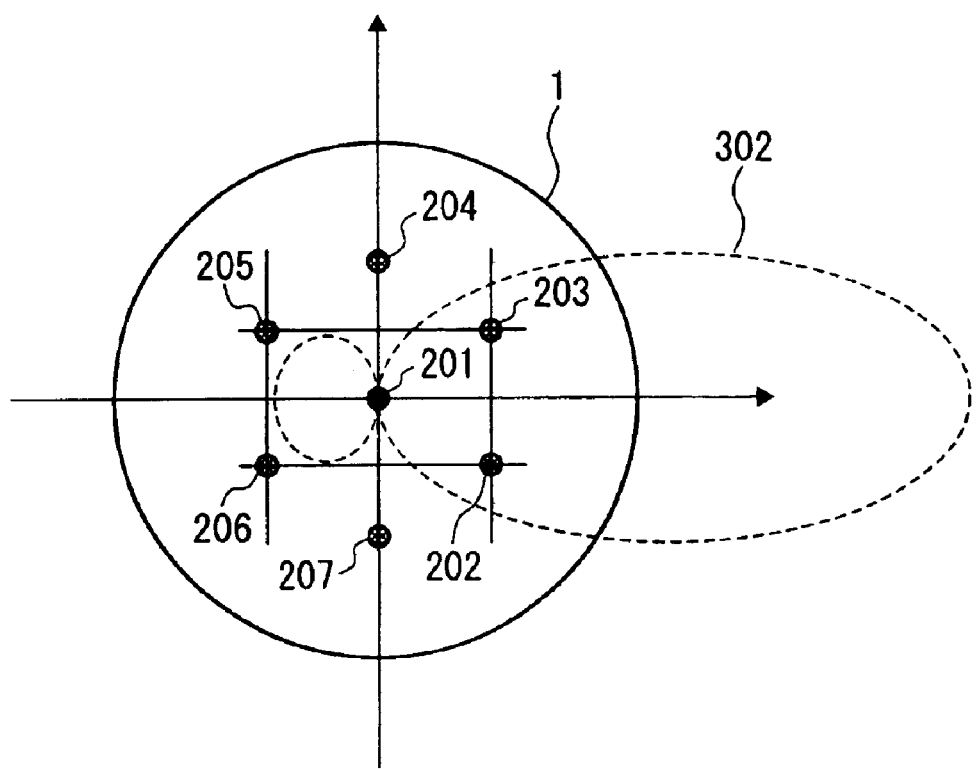
FIG. 3 is a drawing showing an example of a first directivity pattern of the variable directional antenna according to the present invention.
Figure 4:
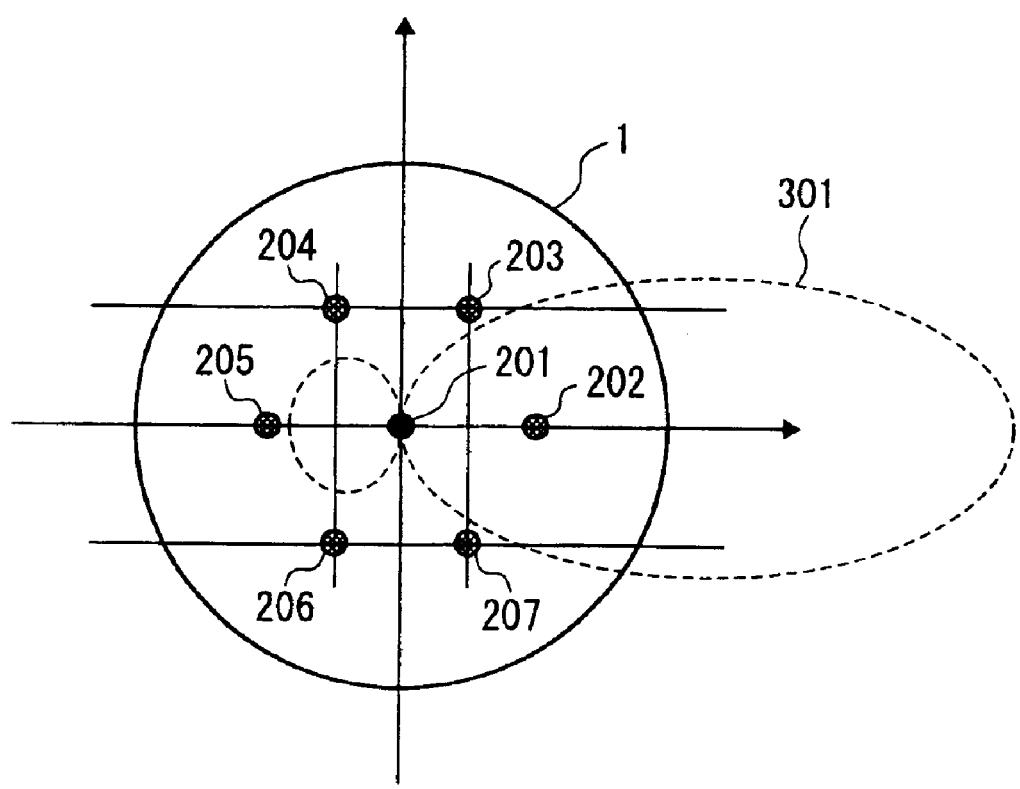
FIG. 4 is a drawing showing an example of a second directivity pattern of the variable directional antenna according to the present invention.
Figure 5:
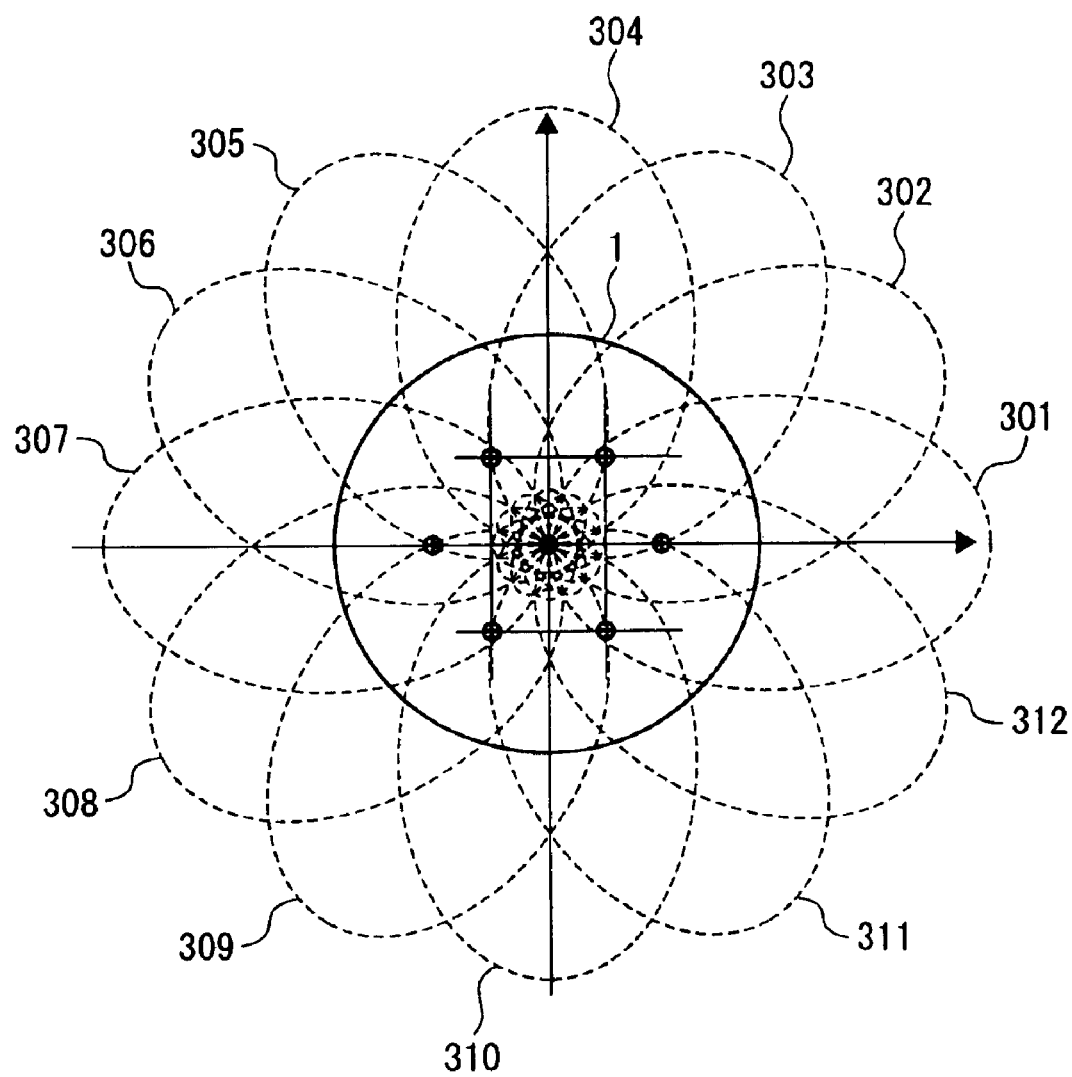
FIG. 5 is a drawing showing examples of all the directivity patterns of the variable directional antenna according to the present invention.

FIG. 3 to FIG. 5 shows, by way of example, how to give directivity. Referring to FIG. 3, a phase shift amount of a reflecting wave of the sub antenna elements (202 to 207) is determined so that a pattern (302) is created which has the maximum directivity at the right hand side of the transverse axis. In this case, the sub antenna elements (205) and (206), (204) and (207), and (203) and (202) are vertically symmetrical with respect to the transverse axis, and thus the respective phase shift amounts are equal to each other.

Thus, it is understood that the pattern shown in FIG. 3 can be formed if the following three phase shift amounts are provided: 1) the phase shift amount φ1 of the sub antenna elements (205) and (206); 2) the phase shift amount φ2 of the sub antenna elements (204) and (207); and 3) the phase shift amount φ3 of the sub antenna elements (203) and (208).

FIG. 4 represents a case in which the entire antenna (1) is turned angles 30° counter-clockwise with keeping the directivity as it is. In this case, each pair of the sub antennas (204) and (206), and (203) and (207) is arranged vertically symmetrically.

Thus, it is understood that the pattern shown in FIG. 4 can be formed if the following four phase shift amounts are provided: 4) the phase shift amount φ4 of the sub antenna element (205); 5) the phase shift amount φ5 of the sub antenna elements (204) and (206); 6) the phase shift amount φ6 of the sub antenna elements (203) and (207); and 7) the phase shift amount φ7 of the sub antenna element (202).

Finally, it is understood that if the seven phase shift amounts φ1 to φ7 with a total of those shown in FIGS. 3 and 4 can be set individually, a variable directional antenna (1) having seven sub antenna elements can provide twelve types of directivity patterns (301 to 312) as shown in FIG. 5.

In a variable phase shifter circuit, a variable reactance element is used. Representative variable reactance elements include a varactor diode. This diode is one in which the capacitance thereof changes depending on a reverse bias voltage applied between an anode and a cathode.

Figure 6:
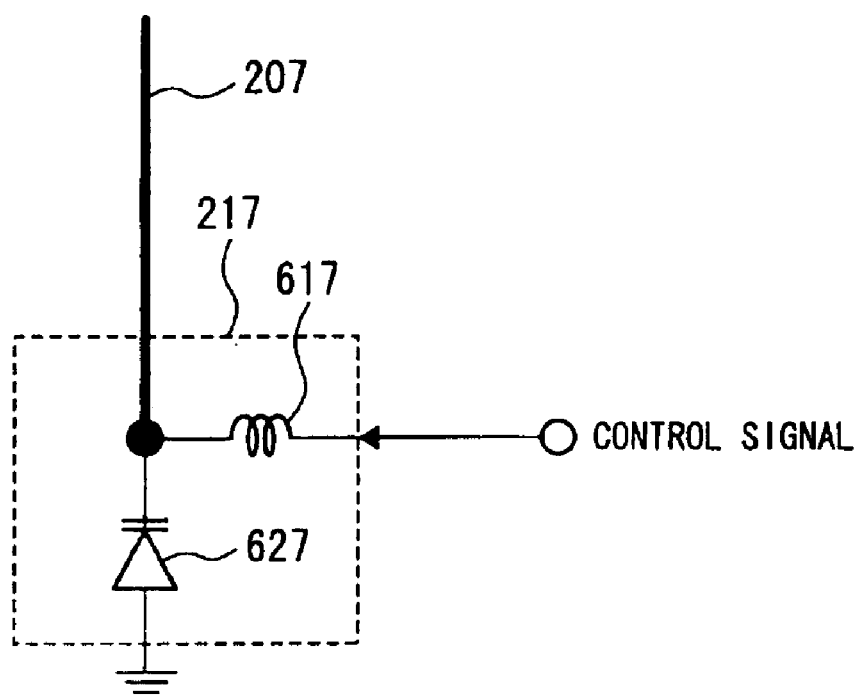
FIG. 6 is a circuit diagram showing a configuration of a variable phase shifter circuit for a reflecting element of the variable directional antenna.

FIG. 6 shows an example of a variable phase shifter circuit using this. In a variable directional antenna using a varactor diode (627) as shown FIG. 6, a control signal is an analog DC voltage applied to the varactor diode (627) via a choke coil (617).

Figure 7:
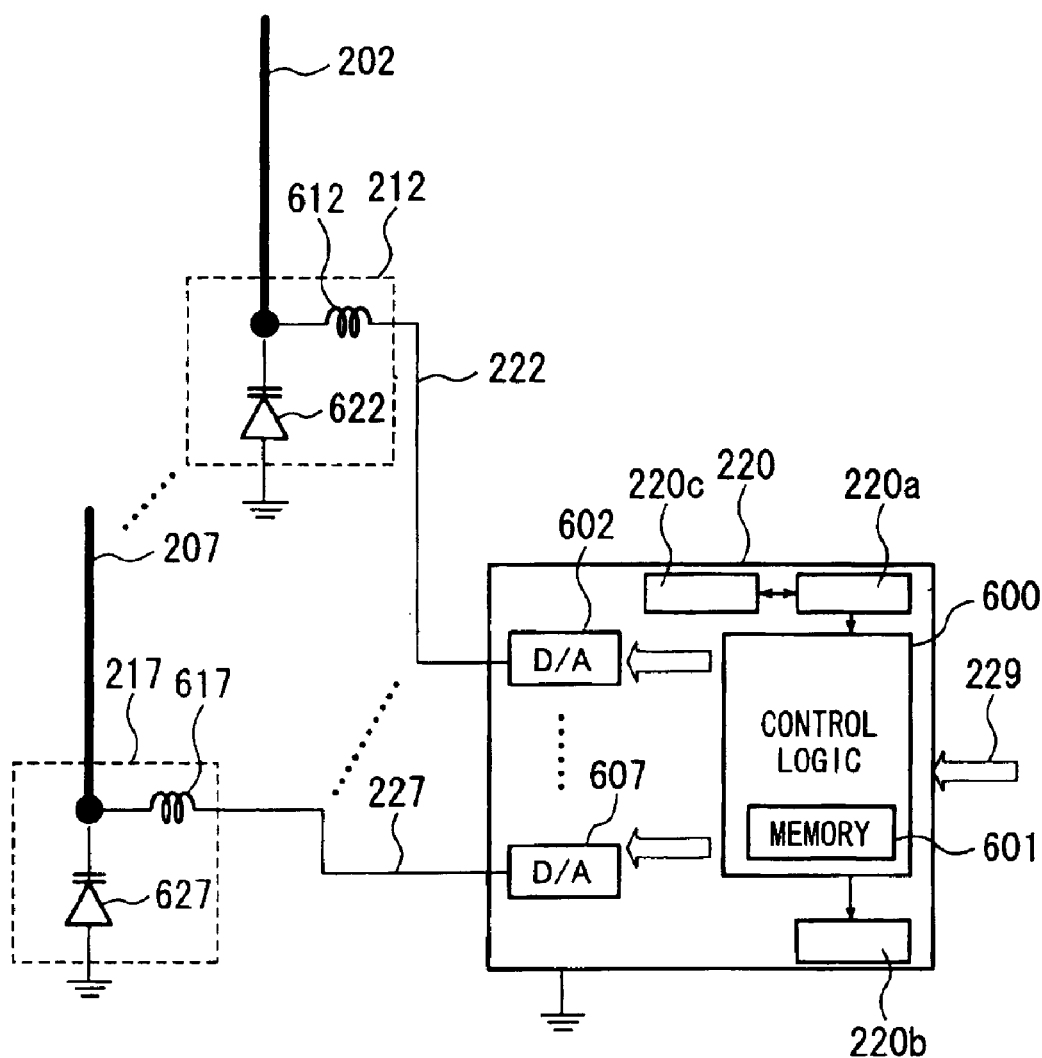
FIG. 7 is a block diagram showing a method of controlling the respective variable phase shifter circuits shown in FIG. 6.

FIG. 7 is a block diagram illustrating a method of controlling the directivity when the variable phase shifter circuit shown in FIG. 6 is used. The control circuit (220) incorporated in the antenna (1) comprises D/A converters (602 to 607), variable phase shifter circuits (212 to 217) corresponding to D/A converters (602 to 607), respectively, and a memory (601) for storing the voltage data corresponding to the application voltage to be supplied to the individual variable phase shifter circuit (212 to 217).

The directivity data (229) sent from the information terminal unit (3) is simple enough for selecting one of twelve directivity patterns (301 to 312). In the case of twelve alternatives, the directivity data can be represented by a signal as small as 4 bits, thereby the configuration and functionality of the information terminal unit can be significantly simplified.

The control circuit (220) receives directivity data (229), and reads out the application voltage data for the respective sub antenna elements (202 to 207) from the memory (601). The application voltage data read from the memory is converted into the application voltages for determining the phase shift amounts of the respective variable phase shifter circuits (212 to 217) by the D/A converters (602 to 607).

Thus the directivity pattern of the variable directional antenna (1) is formed in accordance with the directivity data (229) indicated by the CPU (232) of the information terminal unit (3).

As described above, an information terminal apparatus of the present invention comprising: a variable directional antenna (1); and an information terminal unit (3) for effecting radio communication using the variable directional antenna (1); wherein the information terminal unit (3) having a transmitting/receiving means (231), and a processing means (232) for determining a directivity of the variable directional antenna (1) using the transmitting/receiving means (231); and the variable directional antenna (1) having a control means (220) for controlling the directivity of the variable directional antenna (1) in accordance with directivity data (229) determined by the processing means (232) of the information terminal unit (3); and the processing means (232) further comprising: a first means (2321) for obtaining a directivity characteristics data (232a) of the variable directional antenna (1) by sequentially sending a plurality of directivity data (229) to the variable directional antenna (1); a second means (2322) for determining an optimum directivity with the best receiving condition in accordance with obtained directivity characteristics data (232a); and a third means (2323) for setting a directivity of the variable directional antenna, based on a result obtained by the second means (2322).

The variable directional antenna of the present invention comprising: a main antenna element (201) that is fed from the transmitting/receiving means (231) of the information terminal unit (3) and directly radiates a wave; a plurality of sub antenna elements (202–207) for radiating reflecting wave having a predetermined phase shift amount with respect to the wave radiated from the main antenna element; a variable phase shifter circuit (212) for controlling a reactance component of the sub-antenna element (202); and directivity control data (601a), stored in a memory (601), to control the reactance component of the sub-antenna element; and the control means (220) of the variable directional antenna (1) having: a data receiving means (220a) for receiving directivity data (229) from the information terminal unit (3); a data readout means (220b) for reading out the directivity control data (601a) from the memory (601), based on the received directivity data (229); and a D/A converter (602) for converting the directivity control data (601a) into an analog voltage (227); thereby the control means (220) controls the reactance component of the variable phase shifter circuit (212) in accordance with the analog voltage (222) output from the D/A converter (602).

Figure 8:
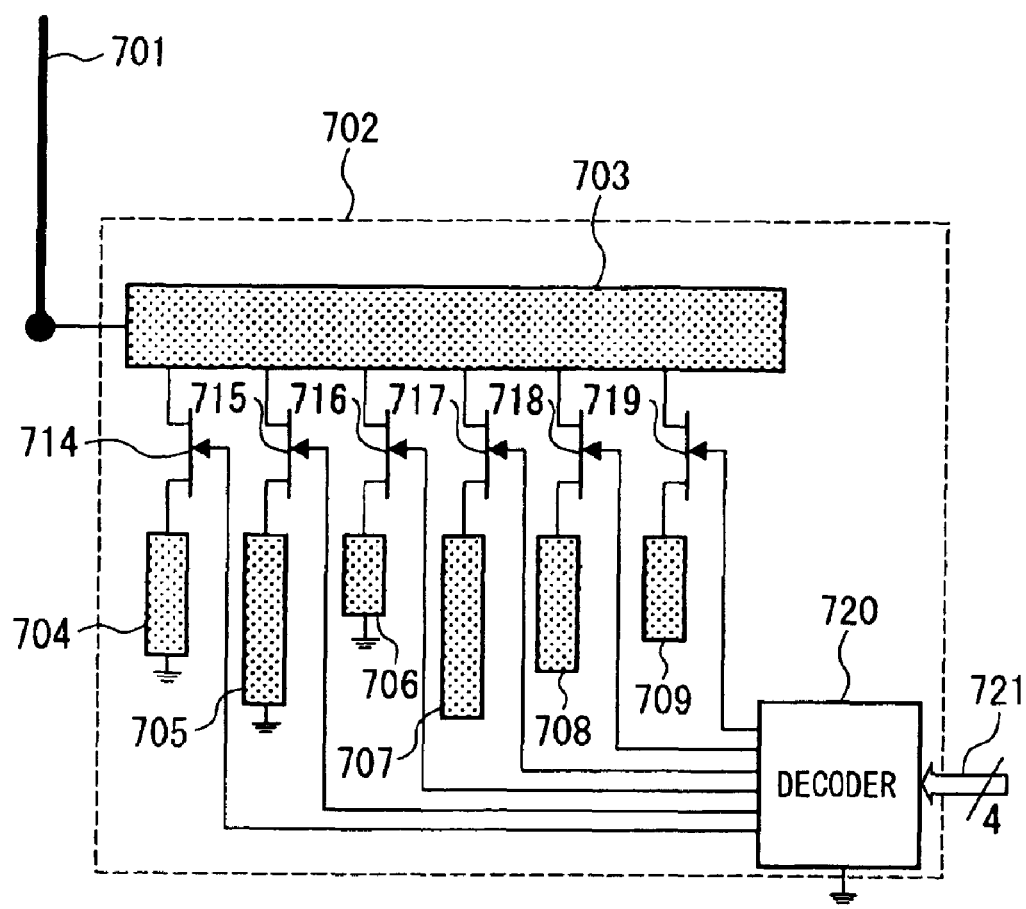
FIG. 8 is a circuit diagram showing another variable phase shifter circuit of the present invention.

FIG. 8 shows another embodiment of the variable phase shifter circuit, which can be used, in the variable directional antenna of the present invention.

In the variable phase shifter circuit shown in FIG. 6 and FIG. 7, seven phase shifter amounts φ1, φ2, φ3, φ4, φ5, φ6, and φ7 are set by the varactor diode, reactance of which is changed by the control voltage continuously. However, the properties of the varactor diodes (627) exhibit a wide range of unit-to-unit variations and the capacitance thereof varies considerably due to temperature variations. For this reason, it is difficult to accurately set the aforementioned seven phase shift amounts, which makes the control more complicated.

On the other hand, as shown in FIG. 5, in the variable directional antenna (1) having the six sub antenna elements (202 to 207) the twelve types of directivity patterns (301 to 312) can all be achieved if the seven different phase shift amounts φ1, φ2, φ3, φ4, φ5, φ6, and φ7 can be set. Accordingly, there is no needs to use a variable phase shifter, phase shift amount of which varies continuously, and it suffices to allow the discrete setting of the above seven varieties of phase shift amounts.

Therefore, in the embodiment shown in FIG. 8, there is provided a variable phase shifter circuit (702) comprising a strip line (703), short stubs (704 to 706), open stubs (708 and 709), a gallium arsenide FETs (714 to 719) each of which serves as a switching element, and a decoder (720) for on/off controlling the FETs (714 to 719).

These short stubs (704 to 706) and open stubs (708 to 709) are connected to the strip line (703) at different positions, and the seven phase shift amounts φ1, φ2, φ3, φ4, φ5, φ6, and φ7 can be set by either turning off all the FETs (714 to 719) or turning on any one of them.

In this embodiment, since the directivity data is a signal corresponding to one of the twelve directivity patterns, it can be represented by a digital signal of as small as 4-bit. Thus, the decoder (720) within the variable phase shifter circuit (702) of each sub antenna is supplied with a 4-bit directivity data (721) that represents one of the twelve directivity patterns.

By decoding the 4-bit directivity data (721), the decoder (720) detects the antenna directivity pattern determined by the processing circuit. Based on the result, the decoder selects a phase shift amount to be set to the variable phase shift circuit (702) corresponding thereto from the seven varieties of phase shift amounts φ1 to φ7 and controls on/off of the FETs (714 to 719) to provide the intended phase shift amount. These seven phase shift amounts can be provided depending on which stub or stubs are connected or not connected to the strip line (703).

While for simplicity of explanation, the decoder (720) corresponding to the control circuit (220) is incorporated in each variable phase shifter circuit (702) as shown in FIG. 8, the decoders for the respective sub antenna elements may be disposed together at a single position near the variable phase shifter circuits (702)

Figure 9:
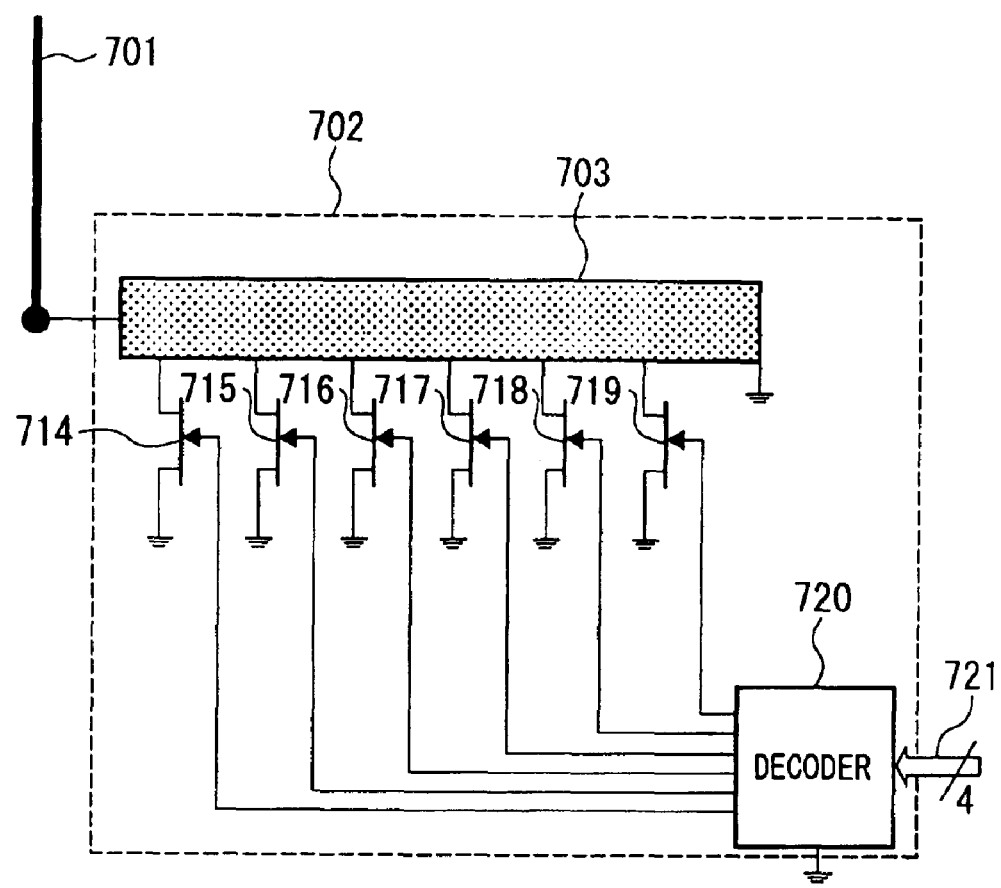
FIG. 9 is a circuit diagram showing still another variable phase shifter circuit of the present invention.

FIG. 9 shows still another embodiment of the variable phase shifter circuit that can be used in the variable directional antenna of the present invention. According to this embodiment, the seven varieties of phase shift amounts φ1, φ2, φ3, φ4, φ5, φ6, and φ7 are provided by turning on and off the switching FETs (714 to 719) to indicate the position to be short-circuited on the strip line (703) connected to the sub antenna elements (701).

Figure 15:
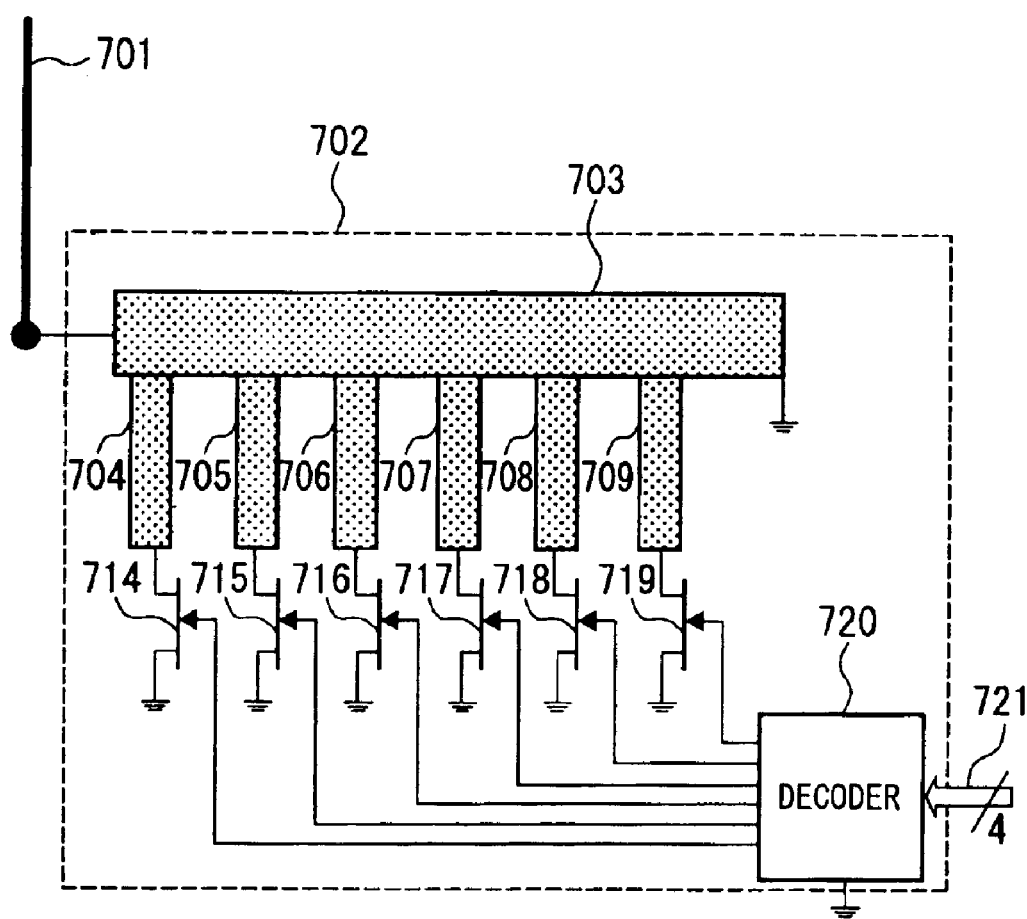
FIG. 15 is a circuit diagram showing still another variable phase shifter circuit of the present invention.
Figure 16:
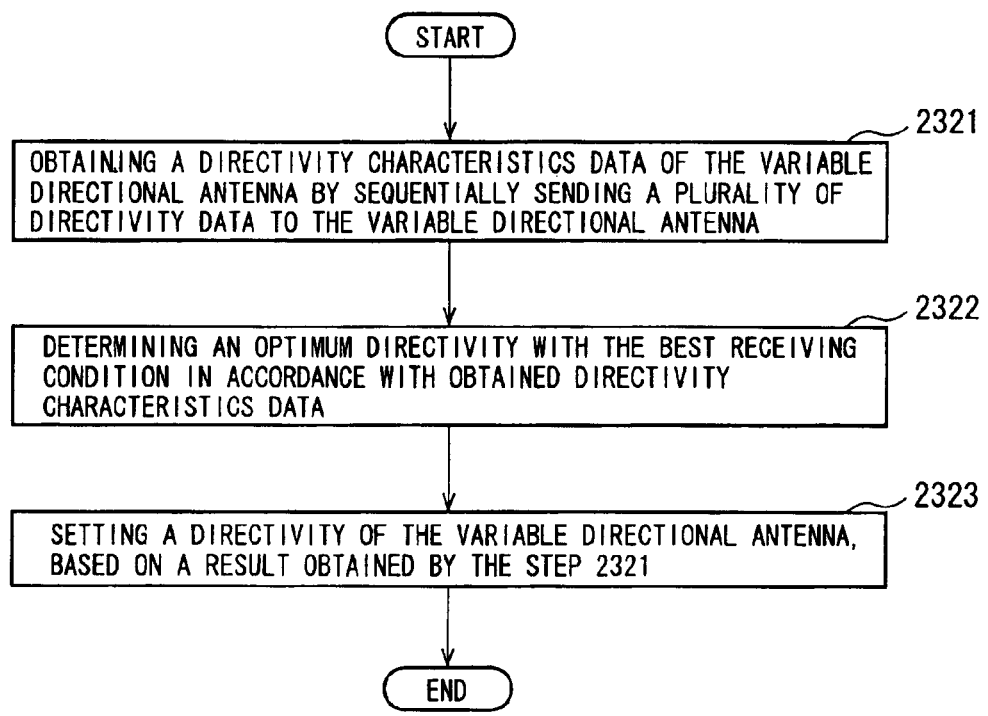
FIG. 16 is a flowchart showing the operation of the present invention.

Alternatively, as shown in FIG. 15, there is considered a method of providing seven varieties of phase shift amounts φ1, φ2, φ3, φ4, φ5, φ6, and φ7 by connecting a plurality of stubs (704 to 709) to the strip line (703) which is in turn connected to the sub antenna element (701), disposing the switching FETs (714 to 719) between one end of each stub (704 to 709) and the ground, and turning on and off the FETs for determining for each stub whether the stub is used as a short stub or an open stub, which is considered within the scope of the invention.

Figure 10:
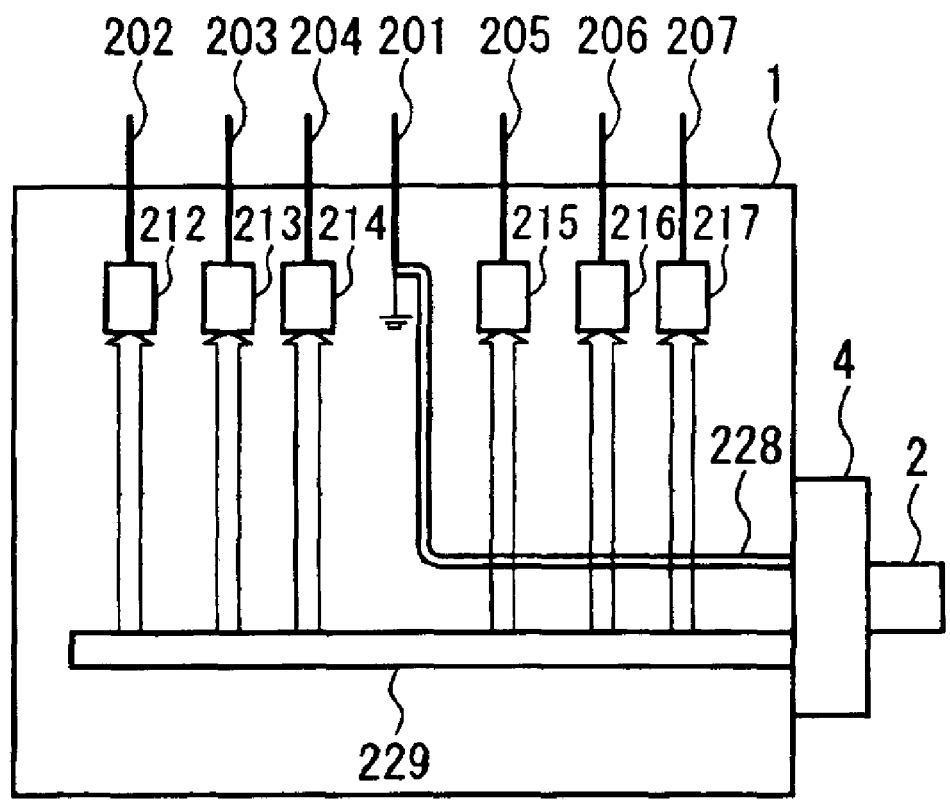
FIG. 10 is a block diagram showing a method of controlling the respective variable phase shifter circuits when the variable phase shifter circuits shown in FIG. 8, FIG. 9, or FIG. 15 are used.

FIG. 10 is a block diagram showing a variable directional antenna that is constructed using a variable phase shifter circuit shown in FIG. 8 or FIG. 9. The 4-bit directivity data (229) output from the control circuit at the information terminal unit side is delivered in parallel to all the respective decoders of the respective variable phase shifter circuits (212 to 217). Each decoder selects one of twelve directivity patterns (301 to 312) by decoding the received 4-bit directivity data s decodes, and determines the phase shift amount of the sub antenna element associated therewith on the basis of the selection.

In the embodiments shown in FIG. 8 to FIG. 10, the variable phase shifter circuit digitally switches the strip line (703) or stubs (704 to 709) connected to the strip line (703), therefore, unit-to-unit variations and the variations due to a temperature change is few. Further, since there is no need to convert the directivity data from the processing unit to an analog signal, the circuit configuration is also simplified.

Figure 11:
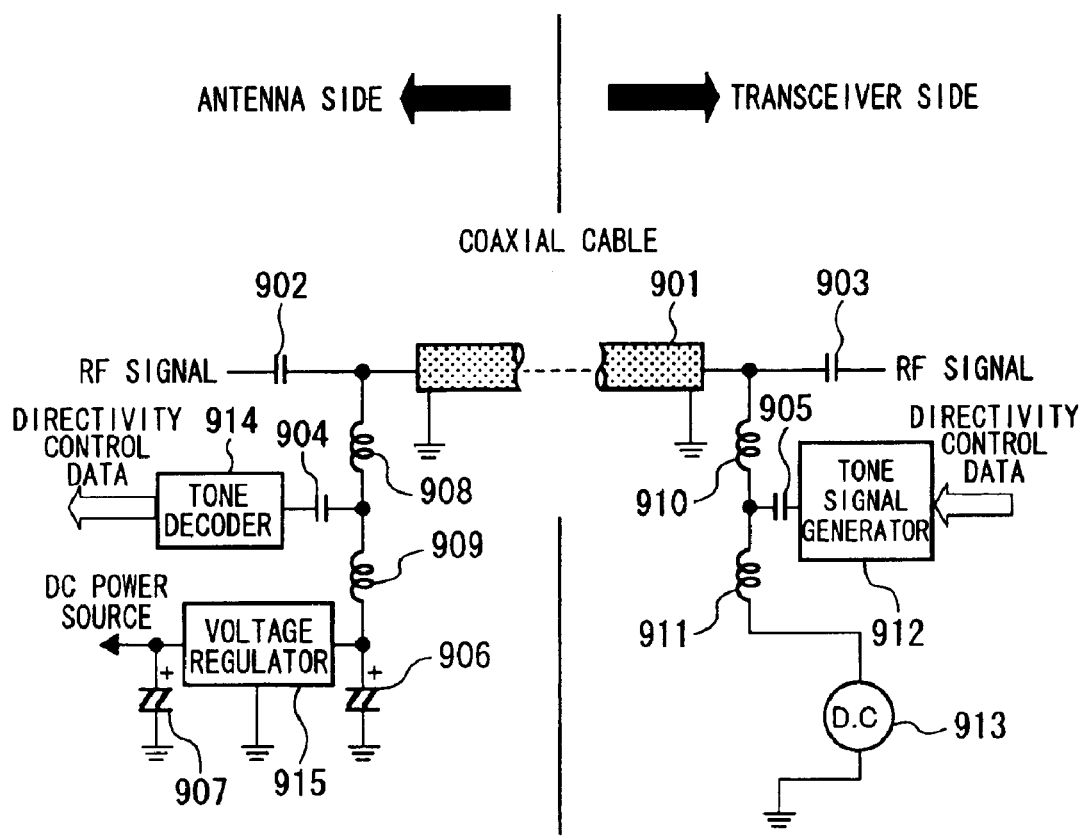
FIG. 11 is a circuit diagram showing multiplexing of a radio frequency signal, a directivity control signal and a power supply.

FIG. 11 is a block diagram showing another embodiment for connecting a variable directional antenna (1) of the present invention and the information terminal unit (3).

According to the present embodiment, connection between the variable directional antenna (1) and the information terminal unit (3) is established by the single coaxial cable (901) and directivity control data, radio frequency signal (RF Signal) and the direct current power supply are supplied to the variable directional antenna (1) from the information terminal unit (3) via the single coaxial cable (901), whereby the configuration is simplified.

According to the present invention, a radio frequency signal (RF signal) is bi-directionally transferred between the variable directional antenna (1) and the information terminal unit (3) via a capacitor (902), the coaxial cable (901) and a capacitor (903). Besides, the leakage of the radio frequency signal to the direct current power supply circuit or control signal circuit is prevented by a radio frequency choke coils (908, 910). Conversely, the directivity data and the direct current power supply are prevented from propagating into the radio frequency circuit by the capacitors (902, 903).

The directivity data is, for example, coded as a combination of tones by a tone generator (912), transmitted to a tone decoder (914) via the capacitor (905), radio frequency choke circuit (910), coaxial cable (901), radio frequency choke circuit (908), capacitor (904), then converted again into the directional data (229) for the variable directional antenna (1), and used for determining the directivity pattern.

On the other hand, the DC power supply is delivered from a power source (913) such as a battery or a power circuit to a regulator (915) incorporated in the variable directional antenna (1) via a low frequency choke coil (911), the radio frequency choke circuit (910), the coaxial cable (901), the radio frequency choke circuit (908), a low frequency choke coil (909). The capacitors (906, 907) are used to stabilize output voltage of the regulator (915). The DC voltage supplied from the regulator (915) is used as a power supply for circuits within the variable directional antenna (1).

Adopting such a configuration as mentioned above enables to connect between the variable directional antenna (1) and the information terminal unit (3) by the single coaxial cable (901) only.

While the present embodiment employs a method in which the directivity data transmission is performed with the combination of tones, the present embodiment is not limited thereto but other appropriate methods such as a pulse string digital transmission may be employed.

Figure 12:
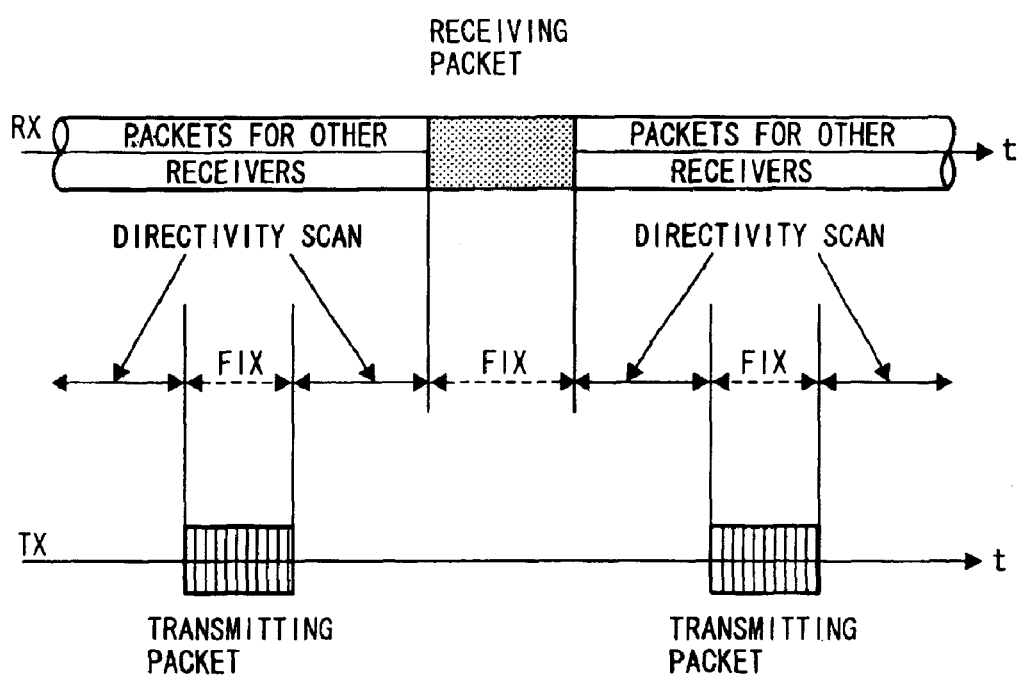
FIG. 12 is a illustrative diagram showing a search timing of a wave incoming direction in a packet communication.
Figure 13:
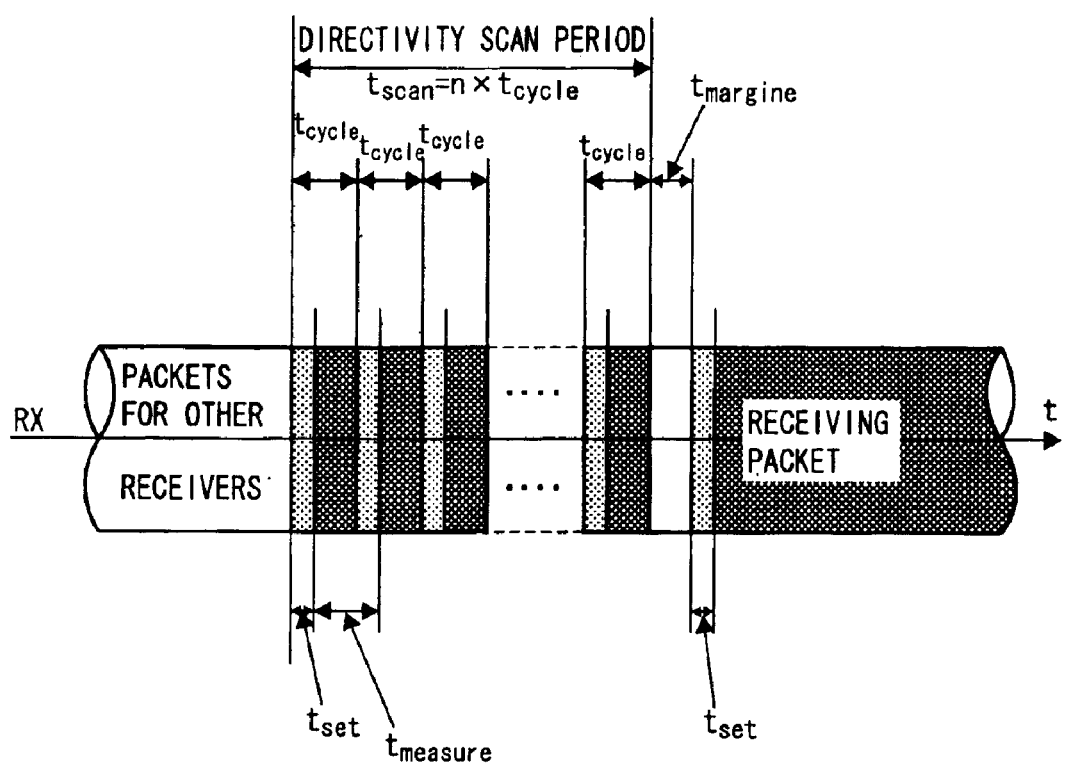
FIG. 13 is an illustrative diagram showing a search timing of a wave incoming direction immediately before receiving a packet.
Figure 14:
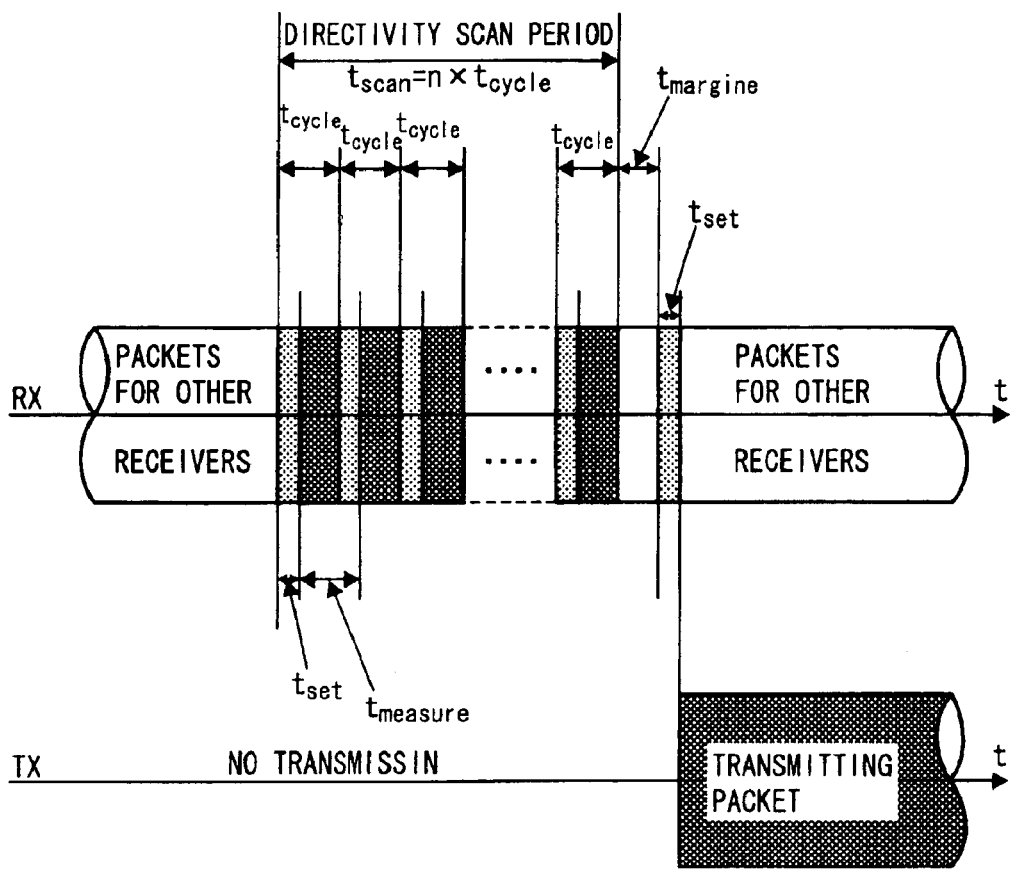
FIG. 14 is a illustrative diagram showing a search timing of a wave incoming direction immediately before transmitting a packet.

FIG. 12 to FIG. 14 are time charts illustrating how to determine the antenna directivity when packet transfer communications are carried out between the information terminal unit having the variable directional antenna of the present invention and a base station (not shown).

Hereinafter, operations for determining the antenna directivity direction when packet transfer communications are carried out between the information terminal unit having the variable directional antenna of the present invention and the base station will be explained referring particularly to FIG. 12 to FIG. 14.

FIG. 12 shows a transmission and receipt timings of the packet transfer, and more specifically, the upper part of the drawing illustrates operations at a receiving side and the lower part illustrates operations at a transmitting side. Though it is packet transfer communication, the relevant signal is multiplexed with a lot of user's signals at the receiving side, and thus waves are sequentially received as shown in the drawing. Whereas at the transmitting side, transmission is performed only during a period when a transmission packet of the information terminal unit is present.

According to the present invention, the transceiver (231) of the information terminal unit (3) detects the quality of the received signal for each of the directivity pattern (301 to 312) of the variable directional antenna (1), and selects the directional pattern with the best receiving condition from them as the optimum directivity, during a period in which there is no transmission packets and no received signals thereto.

Here, the forgoing set of operations is referred to as a directional scanning. During transmitting or receiving a packet, communications are carried out under the state fixed to the optimum directivity pattern by indicating the optimum directivity to the variable directional antenna (1). Once this is done, the optimum directivity is renewed every time when a packet is transmitted or received, and thus the movement or directional change of the antenna can be accommodated.

The directional scanning as mentioned above is desirable to be performed just before a transmission or receipt packet as much as possible. This is because if there is a time lag between the time for starting the directional scanning and the time for transmitting or receiving a packet, the optimum directivity direction may change during this period.

In FIG. 7, 220c denotes a circuit means for use to perform packet communication of the present invention.

It is therefore the directional scanning is carried out at a time just before transmitting or receiving a packet as shown in FIG. 13 and FIG. 14. Further, it is appropriate that this period of time accommodates a time required for directional scanning, a time required for setting the optimum directivity, and some margin.

Now the description will be made for the respective times.

$t_{set}$: time required for transferring directivity data to variable phase shifter circuits and establishing directivity;

$t_{measure}$: time required for measuring quality of received signal;

$t_{cycle}$: time required from the setting of directivity to completion of measuring quality of received signal for single directivity;

$t_{scan}$: time required from the setting of directivity to completion of measuring quality of received signal for all directivity; and $t_{margine}$: margin.

In this case, $$t_{cycle} = t_{set} + t_{measure};$$

$$t_{scan} = n \times t_{cycle}.$$

Thus it is desirable to perform the directional scanning during the period $T = t_{Scan} + t_{margin} + t_{set}$ just before the transmitting of packet or receiving of packet.

As described far, according to the present invention, the variable directional antenna is constructed to have therein a control circuit for controlling the antenna directivity, by which the antenna directivity is controlled. Thus, the information terminal unit can provide various directivities for the variable directional antenna only by transmitting a simple directivity data, thereby interfacing is facilitated and the configuration and functionality of the information terminal unit is simplified.

Further, the variable directional antenna and the information terminal unit is interfaced by a single coaxial cable only, which eliminates a need for a specific power supply at the variable directional antenna side.

Further the variations of the directivity patterns of the variable directional antenna is restricted to a limited discrete number of patterns, thereby the time required for the directional scanning can be reduced.

Further, the directivity pattern is renewed every time when packet communication is carried out by performing the directional scanning during a period just before transmitting or receiving a packet, that is, during a period when no packet communications are carried out, thereby the continuance of the communication is ensured even if the location of the variable directional antenna changes or the communication direction changes.

What is claimed is:

1. An information terminal apparatus comprising: a variable directional antenna and an information terminal unit for effecting radio communication using said variable directional antenna;

said information terminal unit having a transmitting/receiving means, and a processing means for determining a directivity of said variable directional antenna using said transmitting/receiving means;

said variable directional antenna having a control means for controlling said directivity of said variable directional antenna in accordance with directivity data determined by said processing means of said information terminal unit;

said processing means further comprising: a first means for obtaining a directivity characteristics data of said variable directional antenna by sequentially sending a plurality of directivity data to said variable directional antenna during a first period; a second means for determining an optimum directivity with the best receiving condition in accordance with obtained directivity characteristics data; and a third means for setting a directivity of said variable directional antenna, based on a result obtained by said second means during said first period; and said information terminal unit further comprising a circuit means for performing a packet communication, wherein said information terminal unit performs said packet communication by fixing said directivity of said variable directional antenna to said optimum directivity, during a second period which is different from said first period, and said information terminal unit does not perform said packet communication during said first period.

2. The information terminal apparatus according to claim 1, wherein said first period is provided immediately before said information terminal unit transmitting or receiving a packet.

3. An information terminal apparatus comprising: a variable directional antenna; and an information terminal unit for effecting radio communication using said variable directional antenna;

said information terminal unit having a transmitting/receiving means, and a processing means for determining a directivity of said variable directional antenna using said transmitting/receiving means;

said variable directional antenna having a control means for controlling said directivity of said variable directional antenna in accordance with directivity data determined by said processing means of said information terminal unit;

said processing means further comprising: a first means for obtaining a directivity characteristics data of said variable directional antenna by sequentially sending a plurality of directivity data to said variable directional antenna; a second means for determining an optimum directivity with the best receiving condition in accordance with obtained directivity characteristics data; and a third means for setting a directivity of said variable directional antenna, based on a result obtained by said second means;

said variable directional antenna comprising:

a main antenna element that is fed from said transmitting/receiving means of said information terminal unit and directly radiates a wave;

a plurality of sub antenna elements for radiating reflecting wave having a predetermined phase shift amount with respect to said wave radiated from said main antenna element;

a variable phase shifter circuit for controlling a reactance component of said sub-antenna element; and directivity control data, stored in a memory, to control said reactance component of said sub-antenna element; and said control means of said variable directional antenna having:

a data receiving means for receiving directivity data from said information terminal unit;

a data readout means for reading out said directivity control data from said memory, based on said received directivity data; and a D/A converter for converting said directivity control data into an analog voltage;

thereby said control means controls said reactance component of said variable phase shifter circuit in accordance with said analog voltage output from said D/A converter.

4. The information terminal apparatus according to claim 3, wherein said variable phase shifter circuit having a varactor diode connected to said sub-antenna element.

5. An information terminal apparatus comprising: a variable directional antenna; and an information terminal unit for effecting radio communication using said variable directional antenna;

said information terminal unit having a transmitting/receiving means, and a processing means for determining a directivity of said variable directional antenna using said transmitting/receiving a means;

said variable directional antenna having a control means for controlling said directivity of said variable directional antenna in accordance with directivity data determined by said processing means of said information terminal unit;

said processing means further comprising: a first means for obtaining a directivity characteristics data of said variable directional antenna by sequentially sending a plurality of directivity data to said variable directional antenna; a second means for determining an optimum directivity with the best receiving condition in accordance with obtained directivity characteristics data; and a third means for setting a directivity of said variable directional antenna, based on a result obtained by said second means;

said variable directional antenna comprising:

a main antenna element that is fed from said transmitting/receiving means of said information terminal unit and directly radiates a wave;

a plurality of sub antenna elements for radiating reflecting wave having a predetermined phase shift amount with respect to said wave radiated from said main antenna element;

a strip line for controlling a reactance component of said sub-antenna element;

a plurality of stubs provided in order to change said reactance component of said sub-antenna element; and a plurality of switching means for controlling a connection between said strip line and said stubs, respectively, and said control means of said variable directional antenna having:

a data receiving means for receiving directivity data from said information terminal unit; and a decoder for controlling said switching means, based on said received directivity data;

thereby said control means controls said reactance component of said sub antenna in accordance with an output signal of said decoder.

6. The information terminal apparatus according to claim 5, wherein said switching means is either a GaAs FET or a PIN diode.

7. An information terminal apparatus comprising: a variable directional antenna; and an information terminal unit for effecting radio communication using said variable directional antenna;

said information terminal unit having a transmitting/receiving means, and a processing means for determining a directivity of said variable directional antenna using said transmitting/receiving means;

said variable directional antenna having a control means for controlling said directivity of said variable directional antenna in accordance with directivity data determined by said processing means of said information terminal unit;

said processing means further comprising: a first means for obtaining a directivity characteristics data of said variable directional antenna by sequentially sending a plurality of directivity data to said variable directional antenna; a second means for determining an optimum directivity with the best receiving condition in accordance with obtained directivity characteristics data; and
a third means for setting a directivity of said variable directional antenna, based on a result obtained by said second means;
said variable directional antenna comprising:
a main antenna element that is fed from said transmitting/receiving means of said information terminal unit and directly radiates a wave;
a plurality of sub antenna elements for radiating reflecting wave having a predetermined phase shift amount with respect to said wave radiated from said main antenna element;
a strip line for controlling a reactance component of said sub-antenna element; and
a plurality of switching means for connecting between different positions of said strip line and the ground, so as to change said reactance component of said sub-antenna element; and said control means of said variable directional antenna having;
a data receiving means for receiving directivity data from said information terminal unit; and
a decoder for controlling said switching means, based on said received directivity data;
thereby said control means controls said reactance component of said sub antenna in accordance with an output signal of said decoder.

8. An information terminal apparatus comprising: a variable directional antenna; and an information terminal unit for effecting radio communication using said variable directional antenna;
said information terminal unit having a transmitting/receiving means, and a processing means for determining a directivity of said variable directional antenna using said transmitting/receiving means;
said variable directional antenna having a control means for controlling said directivity of said variable directional antenna in accordance with directivity data determined by said processing means of said information terminal unit;
said processing means further comprising: a first means for obtaining a directivity characteristics data of said variable directional antenna by sequentially sending a plurality of directivity data to said variable directional antenna; a second means for determining an optimum directivity with the best receiving condition in accordance with obtained directivity characteristics data; and a third means for setting a directivity of said variable directional antenna, based on a result obtained by said second means;
said variable directional antenna comprising:
a main antenna element that is fed from said transmitting/receiving means of said information terminal unit and directly radiates a wave;
a plurality of sub antenna elements for radiating reflecting wave having a predetermined phase shift amount with respect to said wave radiated from said main antenna element;
a strip line for controlling a reactance component of said sub-antenna element;
a plurality of stubs provided in order to change said reactance component of said sub-antenna element; and
a plurality of switching means for controlling a connection between said stub and said strip line or said stub and the ground so as to be a short stub or an open stub; and said control means of said variable directional antenna having;
a data receiving means for receiving directivity data from said information terminal unit; and
a decoder for controlling said switching means, based on said received directivity data;
thereby said control means controls said reactance component of said sub antenna in accordance with an output signal of said decoder.

9. A variable directional antenna comprising:
a main antenna element that is fed from a transmitting/receiving means of a information terminal unit and directly radiates a wave;
a plurality of sub antenna elements for radiating reflecting wave having a predetermined phase shift amount with respect to said wave radiated from said main antenna element;
a variable phase shifter circuit for controlling a reactance component of said sub-antenna element;
directivity control data, stored in a memory, to control said reactance component of said sub-antenna element; and
a control means for controlling said variable phase shifter circuit;
said control means having:
a data receiving means for receiving directivity data from said information terminal unit;
a data readout means for reading out said directivity control data from said memory, based on said received directivity data; and
a D/A converter for converting said directivity control data into an analog voltage;
thereby said control means controls said reactance component of said variable phase shifter circuit in accordance with said analog voltage output from said D/A converter.

10. The variable directional antenna according to claim 9, wherein said variable phase shifter circuit having a varactor diode connected to said sub-antenna element.

11. A variable directional antenna comprising:
a main antenna element that is fed from a transmitting/receiving means of a information terminal unit and directly radiates a wave;
a plurality of sub antenna elements for radiating reflecting wave having a predetermined phase shift amount with respect to said wave radiated from said main antenna element;
a strip line for controlling a reactance component of said sub-antenna element;
a plurality of stubs provided in order to change said reactance component of said sub-antenna element;
a plurality of switching means for controlling a connection between said strip line and said stubs, respectively; and
a control means for controlling said switching means;
said control means having:
a data receiving means for receiving directivity data from said information terminal unit; and
a decoder for controlling said switching means, based on said received directivity data;
thereby said control means controls said reactance component of said sub antenna in accordance with an output signal of said decoder.

12. The variable directional antenna according to claim 11, wherein said switching means is either a GaAs FET or a PIN diode.

13. A variable directional antenna comprising:
a main antenna element that is fed from a transmitting/receiving means of a information terminal unit and directly radiates a wave;
a plurality of sub antenna elements for radiating reflecting wave having a predetermined phase shift amount with respect to said wave radiated from said main antenna element;
a strip line for controlling a reactance component of said sub-antenna element;
a plurality of switching means for connecting between different positions of said strip line and the ground, so as to change said reactance component of said sub-antenna element; and
a control means for controlling said switching means;
said control means having:
a data receiving means for receiving directivity data from said information terminal unit; and
a decoder for controlling said switching means, based on said received directivity data;
thereby said control means controls said reactance component of said sub antenna in accordance with an output signal of said decoder.

14. A variable directional antenna comprising:
a main antenna element that is fed from a transmitting/receiving means of a information terminal unit and directly radiates a wave;
a plurality of sub antenna elements for radiating reflecting wave having a predetermined phase shift amount with respect to said wave radiated from said main antenna element;
a strip line for controlling a reactance component of said sub-antenna element;
a plurality of stubs provided in order to change said reactance component of said sub-antenna element;
a plurality of switching means for controlling a connection between said stub and said strip line or said stub and the ground so as to be a short stub or an open stub; and
a control means for controlling said switching means; said control means having:
a data receiving means for receiving directivity data from said information terminal unit; and
a decoder for controlling said switching means, based on said received directivity data;
thereby said control means controls said reactance component of said sub antenna in accordance with an output signal of said decoder.

15. An information terminal apparatus comprising: a variable directional antenna and an information terminal unit for effecting radio communication using said variable directional antenna;
wherein
said information terminal unit comprises a transmitter/receiver;
said information terminal unit is configure to determine a directivity of said variable directional antenna using said transmitter/receiver;
said variable directional antenna is configured to control said directivity of said variable directional antenna in accordance with directivity data determined by said information terminal unit; and
said information terminal unit is configured to obtain a directivity characteristics data of said variable directional antenna by sequentially sending a plurality of directivity data to said variable directional antenna during a first time period, to determine an optimum directivity with the best receiving condition in accordance with obtained directivity characteristics data, and to set a directivity of said variable directional antenna, based on said determined optimum directivity during said first period,
wherein said information terminal unit performs a packet communication by fixing said directivity of said variable directional antenna to said optimum directivity, during a second period which is different from said first period, and
said information terminal unit does not perform said packet communication during said first period.

16. The information terminal apparatus according to claim 15, wherein said first period is provided immediately before said information terminal unit transmitting or receiving a packet.

17. An information terminal apparatus comprising: a variable directional antenna; and an information terminal unit for effecting radio communication using said variable directional antenna;
wherein
said information terminal unit comprises a transmitter/receiver;
said information terminal unit is configure to determine a directivity of said variable directional antenna using said transmitter/receiver;
said variable directional antenna is configured to control said directivity of said variable directional antenna in accordance with directivity data determined by said information terminal unit; and
said information terminal unit is configured to obtain a directivity characteristics data of said variable directional antenna by sequentially sending a plurality of directivity data to said variable directional antenna, to determine an optimum directivity with the best receiving condition in accordance with obtained directivity characteristics data, and to set a directivity of said variable directional antenna, based on said determined optimum directivity,
wherein said variable directional antenna comprises:
a main antenna element that is fed from said transmitter/receiver of said information terminal unit and directly radiates a wave;
a plurality of sub antenna elements for radiating reflecting wave having a predetermined phase shift amount with respect to said wave radiated from said main antenna element;
a variable phase shifter circuit for controlling a reactance component of said sub-antenna element;
a memory for storing directivity control data to control said reactance component of said sub-antenna element;
a data input for receiving directivity data from said information terminal unit;
a data reader for reading out said directivity control data from said memory, based on said received directivity data; and
a D/A converter for converting said directivity control data into an analog voltage, said reactance component of said variable phase shifter circuit being controlled in accordance with said analog voltage output from said D/A converter.

18. The information terminal apparatus according to claim 17, wherein said variable phase shifter circuit comprises a varactor diode connected to said sub-antenna element.

19. An information terminal apparatus comprising: a variable directional antenna; and an information terminal unit for effecting radio communication using said variable directional antenna;

wherein said information terminal unit comprises a transmitter/receiver;

said information terminal unit is configure to determine a directivity of said variable directional antenna using said transmitter/receiver;

said variable directional antenna is configured to control said directivity of said variable directional antenna in accordance with directivity data determined by said information terminal unit; and said information terminal unit is configured to obtain a directivity characteristics data of said variable directional antenna by sequentially sending a plurality of directivity data to said variable directional antenna, to determine an optimum directivity with the best receiving condition in accordance with obtained directivity characteristics data, and to set a directivity of said variable directional antenna, based on said determined optimum directivity, wherein said variable directional antenna comprises:

a main antenna element that is fed from said transmitter/receiver of said information terminal unit and directly radiates a wave;

a plurality of sub antenna elements for radiating reflecting wave having a predetermined phase shift amount with respect to said wave radiated from said main antenna element;

a strip line for controlling a reactance component of said sub-antenna element;

a plurality of stubs provided in order to change said reactance component of said sub-antenna element;

a plurality of switches for controlling a connection between said strip line and said stubs, respectively;

a data input for receiving directivity data from said information terminal unit; and a decoder for controlling said switches, based on said received directivity data, said reactance component of said sub antenna being controlled in accordance with an output signal of said decoder.

20. The information terminal apparatus according to claim 19, wherein at least one of said switches is either a GaAs FET or a PIN diode.

21. An information terminal apparatus comprising: a variable directional antenna; and an information terminal unit for effecting radio communication using said variable directional antenna;

wherein said information terminal unit comprises a transmitter/receiver;

said information terminal unit is configure to determine a directivity of said variable directional antenna using said transmitter/receiver;

said variable directional antenna is configured to control said directivity of said variable directional antenna in accordance with directivity data determined by said information terminal unit; and said information terminal unit is configured to obtain a directivity characteristics data of said variable directional antenna by sequentially sending a plurality of directivity data to said variable directional antenna, to determine an optimum directivity with the best receiving condition in accordance with obtained directivity characteristics data, and to set a directivity of said variable directional antenna, based on said determined optimum directivity, wherein said variable directional antenna comprises:

a main antenna element that is fed from said transmitter/receiver of said information terminal unit and directly radiates a wave;

a plurality of sub antenna elements for radiating reflecting wave having a predetermined phase shift amount with respect to said wave radiated from said main antenna element;

a strip line for controlling a reactance component of said sub-antenna element;

a plurality of switches for connecting between different positions of said strip line and the ground, so as to change said reactance component of said sub-antenna element;

a data input for receiving directivity data from said information terminal unit; and a decoder for controlling said switches, based on said received directivity data, said reactance component of said sub antenna being controlled in accordance with an output signal of said decoder.

22. An information terminal apparatus comprising: a variable directional antenna; and an information terminal unit for effecting radio communication using said variable directional antenna;

wherein said information terminal unit comprises a transmitter/receiver;

said information terminal unit is configure to determine a directivity of said variable directional antenna using said transmitter/receiver;

said variable directional antenna is configured to control said directivity of said variable directional antenna in accordance with directivity data determined by said information terminal unit; and said information terminal unit is configured to obtain a directivity characteristics data of said variable directional antenna by sequentially sending a plurality of directivity data to said variable directional antenna, to determine an optimum directivity with the best receiving condition in accordance with obtained directivity characteristics data, and to set a directivity of said variable directional antenna, based on said determined optimum directivity, wherein said variable directional antenna comprises:

a main antenna element that is fed from said transmitter/receiver of said information terminal unit and directly radiates a wave;

a plurality of sub antenna elements for radiating reflecting wave having a predetermined phase shift amount with respect to said wave radiated from said main antenna element;

a strip line for controlling a reactance component of said sub-antenna element;

a plurality of stubs provided in order to change said reactance component of said sub-antenna element;

a plurality of switches for controlling a connection between said stub and said strip line or said stub and the ground so as to be a short stub or an open stub;

a data input for receiving directivity data from said information terminal unit; and a decoder for controlling said switches, based on said received directivity data, said reactance component of said sub antenna being controlled in accordance with an output signal of said decoder.

23. A variable directional antenna comprising:

a main antenna element that is fed from a transmitter/receiver of an information terminal unit and directly radiates a wave;

a plurality of sub antenna elements for radiating reflecting wave having a predetermined phase shift amount with respect to said wave radiated from said main antenna element;

a variable phase shifter circuit for controlling a reactance component of said sub-antenna element;

a memory for storing a directivity control data to control said reactance component of said sub-antenna element; and a data input for receiving directivity data from said information terminal unit;

a data reader for reading out said directivity control data from said memory, based on said received directivity data; and a D/A converter for converting said directivity control data into an analog voltage, wherein said reactance component of said variable phase shifter circuit is controlled in accordance with said analog voltage output from said D/A converter.

24. The variable directional antenna according to claim 23, wherein said variable phase shifter circuit comprises a varactor diode connected to said sub-antenna element.

25. A variable directional antenna comprising:

a main antenna element that is fed from a transmitter/receiver of an information terminal unit and directly radiates a wave;

a plurality of sub antenna elements for radiating reflecting wave having a predetermined phase shift amount with respect to said wave radiated from said main antenna element;

a strip line for controlling a reactance component of said sub-antenna element;

a plurality of stubs provided in order to change said reactance component of said sub-antenna element;

a plurality of switches for controlling a connection between said strip line and said stubs, respectively;

a data input for receiving directivity data from said information terminal unit; and a decoder for controlling said switches, based on said received directivity data, wherein said reactance component of said sub antenna is controlled in accordance with an output signal of said decoder.

26. The variable directional antenna according to claim 25, wherein at least one of said switches is either a GaAs FET or a PIN diode.

27. A variable directional antenna comprising:

a main antenna element that is fed from a transmitter/receiver of an information terminal unit and directly radiates a wave;

a plurality of sub antenna elements for radiating reflecting wave having a predetermined phase shift amount with respect to said wave radiated from said main antenna element;

a strip line for controlling a reactance component of said sub-antenna element;

a plurality of switches for connecting between different positions of said strip line and the ground, so as to change said reactance component of said sub-antenna element;

a data input for receiving directivity data from said information terminal unit; and a decoder for controlling said switches, based on said received directivity data, wherein said reactance component of said sub antenna is controlled in accordance with an output signal of said decoder.

28. A variable directional antenna comprising:

a main antenna element that is fed from a transmitter/receiver means of an information terminal unit and directly radiates a wave;

a plurality of sub antenna elements for radiating reflecting wave having a predetermined phase shift amount with respect to said wave radiated from said main antenna element;

a strip line for controlling a reactance component of said sub-antenna element;

a plurality of stubs provided in order to change said reactance component of said sub-antenna element;

a plurality of switches for controlling a connection between said stub and said strip line or said stub and the ground so as to be a short stub or an open stub;

a data input for receiving directivity data from said information terminal unit; and a decoder for controlling said switching means, based on said received directivity data, wherein said reactance component of said sub antenna is controlled in accordance with an output signal of said decoder.

* * * * *